Aug. 12, 1958 V. F. KLOSTERKEMPER 2,846,757
CUTTING TOOL FOR MILLING MACHINES
Filed June 7, 1956 2 Sheets-Sheet 1

INVENTOR.
Vincent F. Klosterkemper
BY
Wood, Herron & Evans
ATTORNEYS.

Aug. 12, 1958  V. F. KLOSTERKEMPER  2,846,757
CUTTING TOOL FOR MILLING MACHINES
Filed June 7, 1956  2 Sheets-Sheet 2

INVENTOR.
Vincent F. Klosterkemper
BY
Wood, Herron & Evans.
ATTORNEYS.

United States Patent Office 2,846,757
Patented Aug. 12, 1958

2,846,757

CUTTING TOOL FOR MILLING MACHINES

Vincent F. Klosterkemper, Cincinnati, Ohio

Application June 7, 1956, Serial No. 589,960

4 Claims. (Cl. 29—105)

This invention is directed to a rotary cutting tool for machine tools, such as milling machines, in which the rotating tool and workpiece are moved relatively to generate a finished surface.

Conventional milling operations may be divided broadly into two general classes known as "face milling" and "peripheral milling," each utilizing a different type of rotary cutting tool. In general, a tool for face milling has cutting edges which extend outwardly at right angles to the axis of rotation of the tool, so as to generate a flat cutting plane. In cutters for peripheral milling, the cutting edges extend parallel with the axis of rotation and generate a cylindrical cutting zone. In each case, the tool is mounted upon a rotating spindle and the work is moved lineally relative to the spindle or the spindle is moved relative to the work, depending upon the type of machine.

The present invention is directed primarily to tools for face milling operations; however, it will be seen from the following disclosure that, in certain of its aspects, the invention may be utilized in peripheral cutting tools, particularly when the job requires extreme accuracy.

One of the primary objectives of the invention has been to provide a simple face milling cutter which is capable of imparting to the work surface a precision, mirror-like finish, known in the industry as a "super finish"; also to provide a cutter capable of imparting such a finish to the work at a high speed production rate as compared with conventional tools utilized in super-finishing operations.

A further objective has been to provide a tool holder having a demountable cutting bit which may be removed quickly from the holder for reconditioning or replacement when worn and which may be set precisely to its cutting plane in a rapid convenient manner so as to save time in setting up the machine tool for a given job.

The broad principles of the invention are embodied in a spindle-mounted tool holder of relatively heavy, rugged construction having a cutting bit mounted upon a swivel screw anchored in the tool holder, the bit having a precisely straight cutting edge generally radial to the axis of rotation of the holder and at right angles to the axis. The cutting edge is set to generate a flat cutting plane, or plane of rotation, by means of a pair of micrometer-type alignment screws threaded through the bit at opposite sides of the swivel screw and projecting at right angles to it, with their inner ends abutting the surface of the tool holder. By adjusting the two alignment screws in relatively opposite directions, they impart to the bit a rocking motion and thereby permit its straight cutting edge to be set precisely at right angles to the axis of rotation of the spindle and holder. In final position, both alignment screws are tightened, such that their inner ends bear under pressure against the surface of the tool holder, thus locking the bit and its cutting edge rigidly in set position.

A further objective has been to provide a rigid mounting structure for the demountable bit so as to suppress any tendency for the tool to chatter, even minutely, under the cutting forces to which it is subjected.

According to this aspect of the invention, the tool holder or body is of heavy rigid construction, with sufficient mass to damp out vibratory motion or chatter which tends to develop under the cutting action. The cutting bit is snugly fitted into an open slot milled into the periphery of the tool holder along a plane generally parallel with the axis of rotation. The portion of the holder along one side of the slot is of reduced thickness so as to form a slightly flexible clamping jaw. The swivel screw passes through the jaw and bit and its inner end is threaded into the holder so as to draw the jaw firmly into clamping engagement against the bit when tightened. The alignment screws, which reside at right angles to the swivel screw, are also pulled up tight when the cutter is set up; therefore, they draw the bit outwardly against the swivel screw. Accordingly, the bit is clamped rigidly to the holder along two planes, the first plane being parallel with the axis of the swivel screw and the second plane passing at right angles through the first plane and extending parallel with the alignment screws. It has been found in practice, that this application of clamping forces supports the bit rigidly as an integral part of the rigid body. Since the swivel screw functions both as a swivel and as a clamping element, the bit may be demounted very rapidly by loosening the alignment screws slightly, then removing the swivel screw. The bit and its alignment screws as a unit is then slipped from its mounting slot and a replacement bit may be immediately installed and reset in the holder without demounting the holder from the spindle of the machine.

In the preferred practice of the invention, the holder, as viewed in its plane of rotation, is generally rectangular in shape, and a single, straight-edged cutting bit is mounted at one side of its axis of rotation. The single bit is preferable because its cutting edge more readily is set to a true right angular portion. It will be understood however, that when the tool is used in roughing operations, one or more similar swivel-mounted bits may be fitted into other portions of the holder.

In its intended use in precision surface finishing, the cutting edge is set to take a light skim cut while rotating at a relatively high surface or cutting speed, with a corresponding high rate of lineal feed along the work surface. Otherwise expressed, it has been observed that a high rate of surface speed creates the smoothest possible finish. The invention takes advantage of this phenomenon by providing a bit mounting structure which aligns the cutting edge precisely, thus making it possible to skim the work surface lightly and rapidly, with each pass of the tool blending with adjacent passes, leaving no visible or measurable trace and creating a microscopically smooth surface finish within close tolerances of over-all flatness. Since the adjacent cuts or passes leave no trace, very little overlap is required, making it possible to feed the work lineally at a rapid rate in relation to speed of tool rotation. For the same reason, a high rate of cross feed is employed, with very little overlap between adjacent longitudinal cutting paths which are generated by the rotating tool. Accordingly, the tool creates a fine surface finish at a production rate, in terms of area finished in a given unit of time, which is several times greater than the rate possible with conventional tools.

Although the cutting tool is intended primarily for precise surface finishing, it is also capable of rough cutting, in which case the machine is set up to take a deeper cut. After rough cutting, the work may be super-finished by setting up for a skim cut, utilizing the same bit, or if necessary, installing a substitute bit without demounting the tool holder from the spindle.

Various other features of the invention are described in greater detail in the specification with reference to the drawings.

Figure 1:
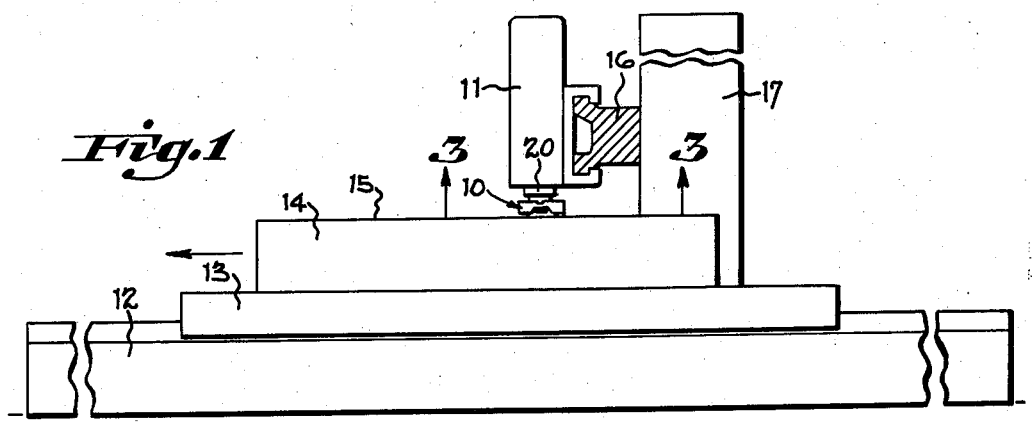
Figure 1 is a diagrammatic side elevation of a planer-type milling machine which has been selected to illustrate the principles of this invention.

Referring to Figure 1, the cutting tool, indicated generally at 10, is mounted in operating position in the rail head 11 of a planar-type milling machine which is shown diagrammatically since its exact construction is not material to the invention. In general, the machine comprises a stationary bed 12 slidably supporting a table 13 which reciprocates lineally upon the bed as indicated by the arrow. The table includes slide ways precisely fitted upon ways of the bed, and the work, indicated at 14, is mounted upon the table and is carried along a precise lineal path of motion with respect to the rotating cutting tool. The drawings illustrate a surface finishing operation in which a fine surface finish is imparted to the top surface 15 of the work by the rotating tool 10.

The head 11 is slidably carried upon a cross rail 16 which extends transversely above the table. The opposite ends of the rail are slidably carried upon vertical columns 17 rising from opposite sides of the bed. Each column includes an elevating rail setting screw (not shown) by means of which the rail may be raised or lowered. The rail further includes a cross feed drive (not shown) which, during a surface finishing operation, shifts the head 11 in stepwise fashion along the rail 16 as the table and workpiece reciprocate.

The rail head 11 includes a tool spindle 18 to which the cutting tool 10 is keyed. The spindle is rotatably journalled and confined axially in a quill 20 which may be fed vertically to the plane of the work to adjust the tool to its cutting plane. During the surface finishing operation disclosed herein, the quill is adjusted to locate the cutting plane of the tool with respect to the work surface, then it is locked in stationary position. After being set up along one side of the work surface, the head is fed transversely across the rail so as to advance the cutting tool in steps upon each reciprocation of the table.

In surface finishing operations, it is necessary that the spindle axis be located precisely perpendicular to the plane of the work surface since the cutting plane generated by the rotating tool naturally resides at right angles to the spindle axis. Moreover, the cutting edge of the bit must reside precisely parallel with the cutting plane, otherwise the surface of the work will show traces of the cuts where they overlap.

Figures 2, 3:
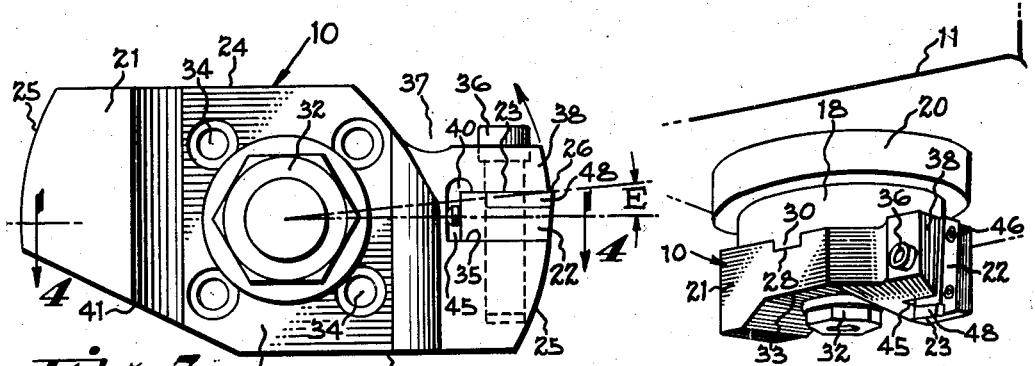
Figure 2 is an enlarged perspective view of the cutting tool as viewed from beneath the rail head of Figure 1.
Figure 3 is an enlarged bottom plan view of the cutting tool as viewed along line 3—3 of Figure 1.
Figures 4, 6:
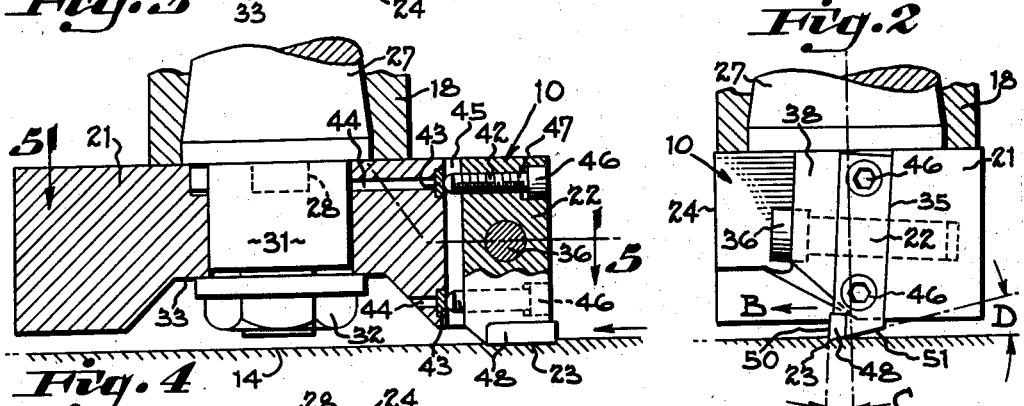
Figure 4 is a sectional view of the tool taken along line 4—4 of Figure 3.
Figure 6 is an end view as projected from Figure 4.
Figure 5:
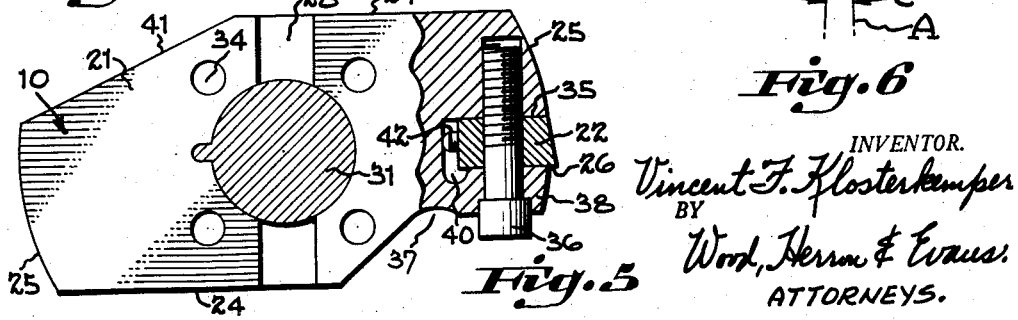
Figure 5 is a partial sectional view taken along line 5—5 of Figure 4.

Referring to Figure 4, the cutting tool 10 consists of a tool holder or body 21, generally of rectangular shape, fabricated from a suitable grade of steel. The cutting blade or bit 22 is mounted in one end portion of the body with its cutting edge 23 projecting downwardly from the lower surface of the holder. As viewed from below (Figure 3), the two straight sides 24 of the holder are parallel with one another and its opposite ends are rounded as at 25. The outer end of bit 22 blends with the curvature of the holder, with its leading edge 26 projecting slightly beyond the periphery.

The holder 21 includes a tapered arbor 27 which interfits the tapered socket (not shown) of the rotating spindle. The spindle includes suitable mechanism, such as a draw bar, which pulls the arbor telescopically into the spindle socket. The upper surface of the holder includes the key way 28 which interfits a key 30 projecting outwardly from the spindle, thus establishing a driving connection to the holder. The axis of the arbor is located at or near the center of mass such that the cutting tool rotates in a state of balance to eliminate any tendency to vibrate at high speed. The arbor includes a shank 31 passing through the bore of the body (Figure 4), its opposite end being threaded and including a nut 32 which clamps the arbor in position. To accommodate the nut, the lower face of the body is recessed as at 33. The body of the tool also includes a series of bolt holes 34 spaced apart in a circle to receive the bolts which are necessary to mount the holder upon other types of spindles.

The rocking blade or bit 22 is fitted into a mounting slot 35 machined into the end portion of the cutter body. The bit 22 fits snugly into its slot and is clamped in place by the swivel screw 36. To provide the clamping action, the straight side 24 of the body adjacent the slot has an inset or step 37 which delineates a slightly yieldable clamping jaw 38 of reduced metal section which forms one side of the mounting slot. The flexibility of the jaw is increased by machining a semicircular groove 40 across the base of the slot. To balance the holder, its diagonal corner portion is cut away as at 41, the mass of the inset 37 and removed corner 41 being substantially equal.

Rocking motion is imparted to the bit 22 by the two micrometer-type alignment screws 42—42 which are engaged in threaded bores extending through the bit on opposite sides of the swivel screw 36 and at right angles to it. The inner ends of the alignment screws seat against the hardened buttons 43—43 which are mounted in cylindrical recesses formed in the base of slot 35. Each recess includes an open pilot bore 44 which allows the button to be dislodged if necessary. The inner ends of the alignment screws, which bear against the buttons, preferably are of the oval point type, presenting a spherical surface to the buttons. The hardened buttons prevent the base of the slot from becoming worn under the pressure imposed by the alignment screws and impart rigidity to the bit when the screws are tightened.

To allow the blade to be rocked, mounting slot 35 has a greater depth than the bit, leaving the clearance space 45 between the bit and slot. The adjustment screws preferably are of the socked type, their heads 46 residing in counter bores having sufficient depth as at 47 to allow adjustment of the screws. It will be seen that rotation of the two screws in opposite directions, with the swivel screw loosened, will impart rocking motion to the bit to permit its straight cutting edge 23 to be aligned precisely in its own plane of rotation. The screw threads preferably have a fine lead, such that they have a micrometer action in setting the cutting edge. Since the alignment screws reside on opposite sides of the swivel screw, they oppose one another and allow the bit to be rocked in either direction. Moreover, by their opposed action, the cutting edge can be set with exceptional precision and rigidity by tightening both screws at final position to create a clamping action of the bit against the swivel screw. As the screws progressively are tightened in setting the cutting edge, its alignment may be checked, for example by making a test cut from time to time. After both alignment screws are drawn up right, the swivel screw is tightened to clamp the bit in its slot.

It will be observed that when finally set for operation, the bit is clamped in two right angular planes, that is, along one plane common to the axes of the alignment screws 42 and along a second plane common to the axis of the swivel screw 36. The two clamping forces acting upon the bit secure it against any possibility of minute displacement under the cutting forces; moreover, the right angular forces suppress any tendency for the tool to chatter as it cuts by virtue of the mass of holder 21 in which the bit is rigidly locked.

In its preferred form, the bit 22 includes an insert 48 of carbide or equivalent hard material which is cemented in a recess according to conventional practice. The insert includes the cutting edge 23 noted earlier.

As viewed in Figure 6, the bit mounting slot 35 is milled at a slight angle in relation to the vertical axis of rotation A of the holder. The working face 50 of the bit and its insert 48 is thus inclined at a corresponding angle upwardly and rearwardly from the cutting edge 23 in the direction of rotation (arrow B) of the holder. This tool angle or axial rake angle is indicated at C in Figure 6. The lower or cutting end of the bit is also inclined upwardly and rearwardly from the cutting edge to delineate the heel 51 of the bit. The clearance angle or bottom rake angle is indicated at D in Figure 6.

Referring to Figure 3, it will be seen that the cutting edge 23 is set at a slight radial rake angle indicated at E. In other words, the cutting edge resides along a line tangent to a circle of rotation, as distinguished from radial to the axis of rotation. The raidial rake angle E creates a slight feathering action, in the direction of rotation, which throws the metal chips or cuttings outwardly. It has been found in practice, that the best cutting action for the various grades of steel is obtained by setting the bit at the combined angles C, D and E.

Figure 9:
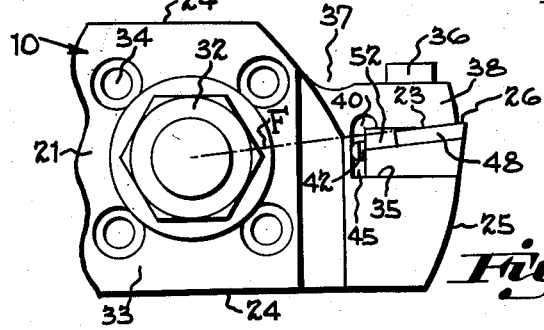
Figure 9 is a view similar to Figure 3, showing a slightly modified embodiment of the invention.

When cutting cast iron, the same holder 21 is utilized but a slightly modified bit is mounted in it, as shown in Figure 9. In this case, a notch 52 is machined at an angle in the bit, such that the cutting edge of the carbide insert 48 resides along line F, which is radial to the axis of rotation. By this arrangement, the same holder may be converted for steel or cast iron finishing by installing interchangeable bits without demounting the holder from the machine. In cast iron cutting, the radial rake angle is omitted because the metal chips or cuttings, being very fine, do not interfere with the cutting action and need not be expelled as they are formed. In the modified arrangement, the bit is set at the same axial rake angle C and bottom rake angle D of Figure 6, since these angles are determined by the bit mounting slot 35 of the holder.

In a super finishing operation, the cutter, whether working upon steel or cast iron, is driven at a cutting speed, or surface speed relation to the work, which is several times greater than conventional practice. The bit is set to take a light skim cut, usually between .002 and .003 of an inch in depth, but never greater than .005 (Figures 4 and 6). By way of example, in super finishing steel with a cutting tool having a working diameter of approximately 10 inches (circular path generated by the rotating cutting edge), the spindle may be driven at 205 R. P. M. and the table may be fed lineally at 205 inches per minute. These speeds have been selected since they were available on the machine utilized; however, it will be recognized that, within limits, comparable results may be obtained at other combinations of speeds.

The indicated working diameter and speeds produce a theoretical cutting speed or surface speed of 6,439 inches per minute or, in round figures, 530 feet per minute, calculated at the full 10 inch diameter of the cutting plane. In other words, the outer edge of the cutting bit, disregarding table motion, advances in a circle at the rate of 530 feet per minute relative to the work surface. Since the table is fed at the rate of 205 inches per minute, the work is advanced at the rate of one inch for each revolution of the cutter. In the present example, the cutting edge 23 of the bit is a fraction greater than one inch in length; hence, each pass of the tool overlaps the succeeding pass in the direction of table feed, by this fractional difference. The overlap for each bit rotation is indicated diagrammatically at C in Figure 7.

At the end of each cutting stroke, or reciprocation of the table, the end of the workpiece will have advanced beyond the rotating cutter; at this point, the rail head is fed transversely to position the cutter for the next pass or cut. Utilizing a cutting plane having a diameter of ten inches, the cutter is fed transversely in steps a fraction less than ten inches, for example, 9½ inches. This cross feed step is indicated by the arrow H in Figure 8. With a cross feed of 9½ inches, each new cutting path 53 slightly overlaps the prior one 54, as indicated at J in Figure 8. In the example given, this overlap amounts approximately to ½ inch.

Figure 7:
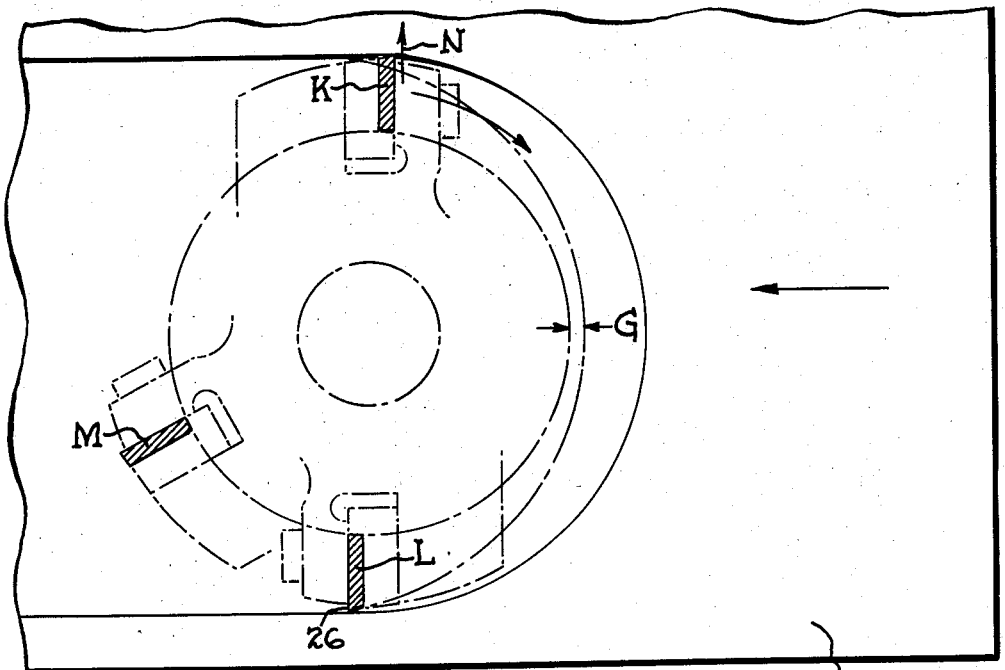
Figure 7 is a diagrammatic plan view showing the cutting action of the bit relative to the work surface.
Figure 8:
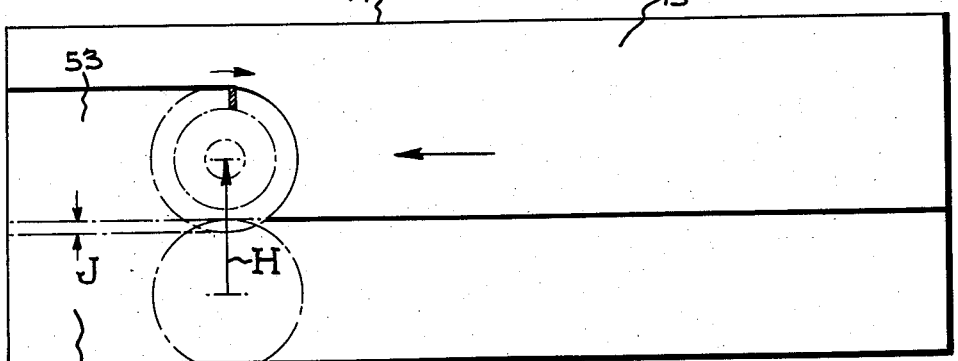
Figure 8 is a diagrammatic plan view further illustrating the cutting action.

It will be observed in Figures 7 and 8, that the leading edge 26 of the insert cuts down to the .002 to .003 of an inch depth as the work advances, and that the straight cutting edge 23 lightly cuts away the slight deviations in the flat surfaces. This takes place during approximately 180 degrees of rotation of the cutting bit; that is, from position K to the position L of Figure 7, because the work is advancing toward the rotating cutter as indicated by the arrow. During the second 180 degrees of rotation as indicated by position M (Figure 7), the cutting edge passes over the previously finished surface. Any minute roughness which may still exist in the finished surface will therefore be removed during the non-cutting rotation; thus, any given point on the surface of the work receives first a rapid skim cut then a second very light scraping pass. The two-time action imparts to the work surface a smooth final finish which is equivalent to a honing action.

During the cutting portion of rotation, the cuttings, which form along the working face 50 of the cutting edge, are expelled in the direction indicated by the arrow N in Figure 7, due to the radical rake angle E noted earlier.

Upon completion of the job at the above rates of cutter rotation, table feed and cross feed, the finished surface checks out at 25 microinches (one millionth of an inch) on a conventional surface indicator. This represents an exceptional degree of smoothness, even when the operation is performed under the painstaking slow rate of conventional tools and methods. Moreover, the production rate, in terms of area finished in a given unit of time, is many times greater than is obtainable with conventional operations.

These unexpected results are brought about by two primary factors. In the first place, the micrometer alignment of the single cutting edge makes one cut blend with successive cuts without any visible or measurable trace. Therefore, practically no overlap of cuts is necessary, greatly increasing the rate of production. In the second place, precise alignment makes it possible to operate the indicated light skim cut, thereby reducing the cutting resistance and making it possible to rotate the cutter at speeds far in excess of those conventionally used. Experimental work indicates that the high cutting speed produces a finer finish, especially when operating under a light cut.

By way of comparison, a conventional superfinishing tool usually is operated at a depth between .010 and .015 of an inch, due to the design of the tool. This cutting depth creates a high degree of cutting resistance, or chip load, and since spindle torque or horsepower is limited, it becomes necessary to gear down the spindle to overcome the turning resistance. As a consequence, the surface is finished at a cutting speed which is only a small fraction of the speed of the improved cutter. Furthermore, to obtain the desired smoothness, a great deal of overlapping of the cuts is necessary. As a consequence, the rate of table feed and cross feed is necessarily slow. It has been determined in a test run, utilizing similar jobs for comparison, that the high speed tool of this invention finishes its job approximately in onetenth the time required with conventional equipment. Moreover, the conventional tool requires more set-up time since it must be demounted for sharpening or other operations before being placed in service, while the improved tool is aligned or set up while mounted upon the spindle.

When the cutting bit becomes worn after prolonged service and requires sharpening or replacement, it may be removed very quickly by unscrewing swivel screw 36 and withdrawing it from the holder. The bit and its alignment screws 42, as a unit, is then withdrawn from the slot. The buttons 43 preferably are press fitted into their recesses and remain in place when the bit is removed. It will be understood that, so long as the bit is in good condition, it is set to alignment, when required, without demounting the holder from the spindle, thus saving a great deal of time. When worn, the cutting edge may be reground with a simple fixture, then mounted in the holder and reset at the spindle.

Having described my invention, I claim:

1. A face milling cutter comprising a tool holder having mounting means for attaching the same to a rotating spindle for rotation about an axis of rotation, said holder having a bit mounting opening formed therein outwardly from said axis, said opening residing in a plane generally parallel with the said axis of rotation, a cutting element mounted in said opening and having a cutting edge projecting outwardly from the holder, a swivel element passing through said opening and through said cutting element along an axis generally at right angles to the said axis of rotation, said swivel element having opposite end portions anchored in said holder, and a pair of rotatable alignment elements passing through the cutting element and having their ends engaging the holder, said alignment elements residing along axes generally at right angles to the axis of the swivel element and on opposite sides thereof, said alignment elements imparting rocking motion to the cutting element relative to said holder upon relative rotation of the alignment elements for setting said cutting edge at right angles to the axis of rotation and causing the cutting edge to generate a flat cutting plane upon rotation of the holder about said axis relative to the surface of a workpiece.

2. A face milling cutter comprising a tool holder having mounting means for attaching the same to a rotating spindle for rotation about the axis of the spindle, said holder having a slot formed therein, said slot residing in a plane generally parallel with the said axis of rotation, said holder having a yieldable portion at one side of said slot which provides a clamping jaw, a cutting bit mounted in said slot, said bit having a cutting edge projecting outwardly from the holder on a side opposite the said mounting means, said cutting edge extending along a line generally radial to the said axis of rotation, a swivel screw passing through said clamping jaw and bit along an axis generally at right angles to said axis of rotation and having an opposite portion threaded into said holder, said swivel screw when tightened, forcing said jaw into clamping engagement with the bit, and when loosened, pivotally confining the bit in the slot, and a pair of alignment screws engaging the bit and connected to the holder, said alignment screws residing along axes generally at right angles to the axis of the swivel screw and on opposite sides thereof, said alignment screws, upon relative rotation thereof, imparting said rocking motion to the bit and setting the cutting edge in micrometer fashion at a selected angle to the axis of rotation, thereby causing the cutting edge to generate a cutting plane upon rotation of the holder about said axis relative to the surface of a workpiece, said swivel screw being tightened and clamping the bit at said selected angle.

3. A face milling cutter comprising a tool holder having mounting means for attaching the same to a rotating spindle for rotation about the axis of the spindle, said holder having a slot formed therein, said slot residing in a plane generally parallel with the axis of rotation of the holder, a cutting bit mounted in said slot, said bit having a cutting edge projecting outwardly from the holder on a side opposite the said mounting means, said cutting edge extending along a line generally radial to the said axis of rotation, a swivel element in the holder passing through said slot and bit along an axis generally at right angles to said axis of rotation and adapting the bit to be rocked relative to the holder along the plane of the slot, and a pair of alignment screws threaded through the bit and engaging the holder, said alignment screws residing along axes generally at right angles to the swivel element and on opposite sides thereof, said alignment screws, upon relative rotation thereof, imparting rocking motion to the bit, thereby setting the cutting edge in micrometer fashion at a selected angle to the axis of rotation, said alignment screws being rotated relative to one another and forcing the bit bodily in said selected angular position along a plane generally at right angles to the axis of the swivel element, thereby clamping the bit and cutting edge in said selected angular position and locking the bit rigidly to the holder, the cutting edge thereby generating a selected cutting plane upon rotation of the holder about said axis relative to the surface of a workpiece.

4. A face milling cutter comprising a tool holder having mounting means for attaching the same to a rotating spindle for rotation about the axis of the spindle, said holder having an open slot formed therein, said slot residing in a plane generally parallel with the said axis of rotation, a cutting bit mounted in said slot, said bit having a cutting edge projecting outwardly from the holder on a side opposite the said mounting means, said cutting edge extending along a line generally radial to the said axis of rotation, a swivel screw passing through said slot and bit along an axis generally at right angles to said axis of rotation, said screw having a head engaging the holder and having an opposite portion threaded into said holder, said swivel screw pivotally confining the bit in the slot and adapting the bit to be rocked relative to the holder along the plane of the slot, and a pair of alignment screws threaded through said bit, said alignment screws residing generally at right angles to the swivel screw, a pair of abutment elements mounted in the holder, said alignment screws having inner ends in bearing engagement with the abutment elements, said alignment screws imparting rocking motion to the bit upon relative rotation thereof and setting the cutting edge in micrometer fashion at right angles to the axis of rotation, thereby causing the cutting edge to generate a flat cutting plane upon rotation of the holder about said axis relative to the surface of a workpiece, said swivel screw being removable from the slot and bit, adapting the bit and alignment screws as a unit to be demounted from the holder.

References Cited in the file of this patent

UNITED STATES PATENTS

| | | |
|---|---|---|
| 989,674 | Weiss | Apr. 18, 1911 |
| 1,376,438 | Huther | May 3, 1921 |
| 1,460,030 | Mattson | June 26, 1923 |
| 2,368,736 | Wyrick | Feb. 6, 1945 |
| 2,413,406 | Dooling | Dec. 31, 1946 |
| 2,584,449 | Hoglund | Feb. 5, 1952 |

FOREIGN PATENTS

| | | |
|---|---|---|
| 22,114 | Finland | Nov. 17, 1947 |